United States Patent Office 2,772,747
Patented Dec. 4, 1956

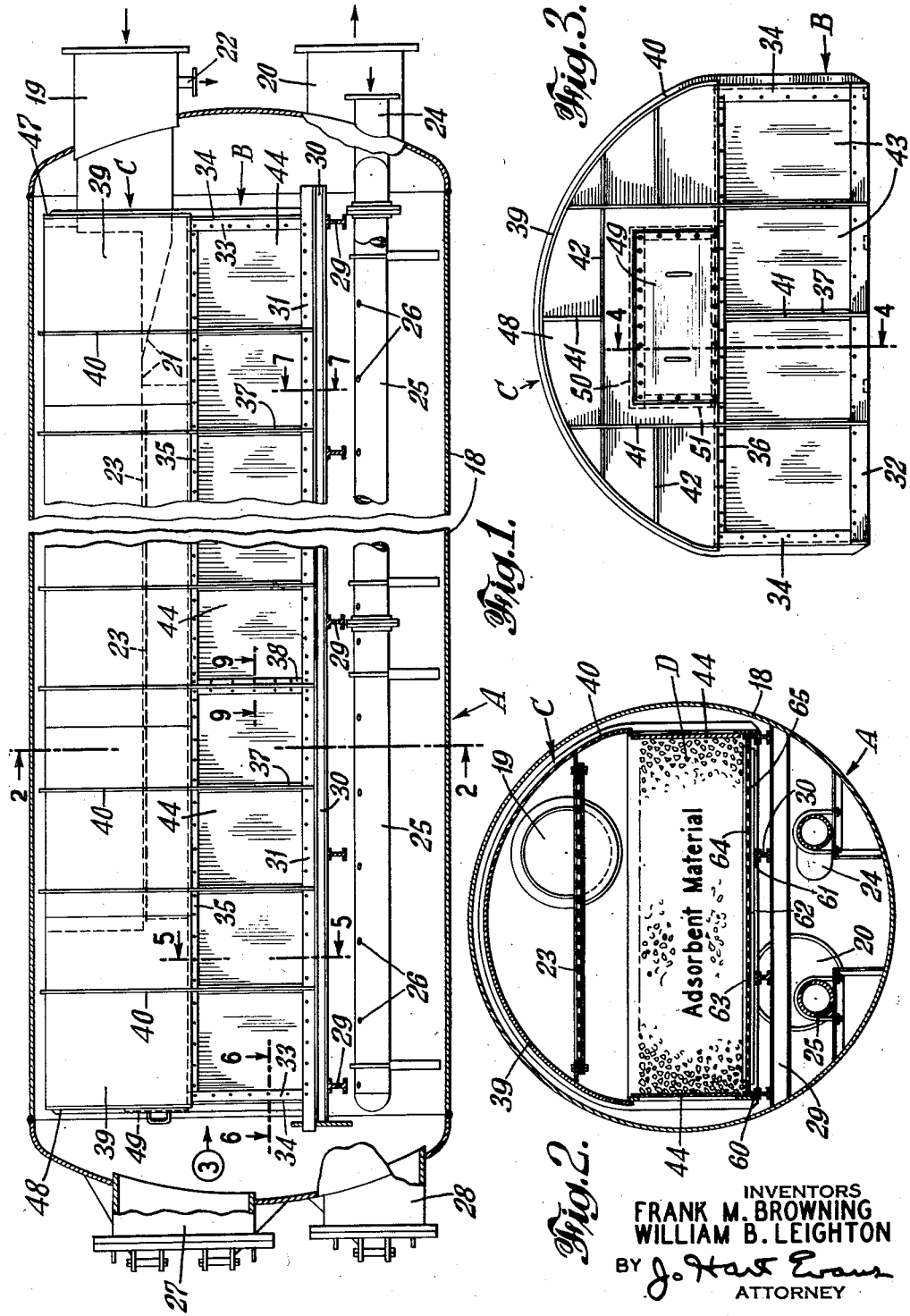

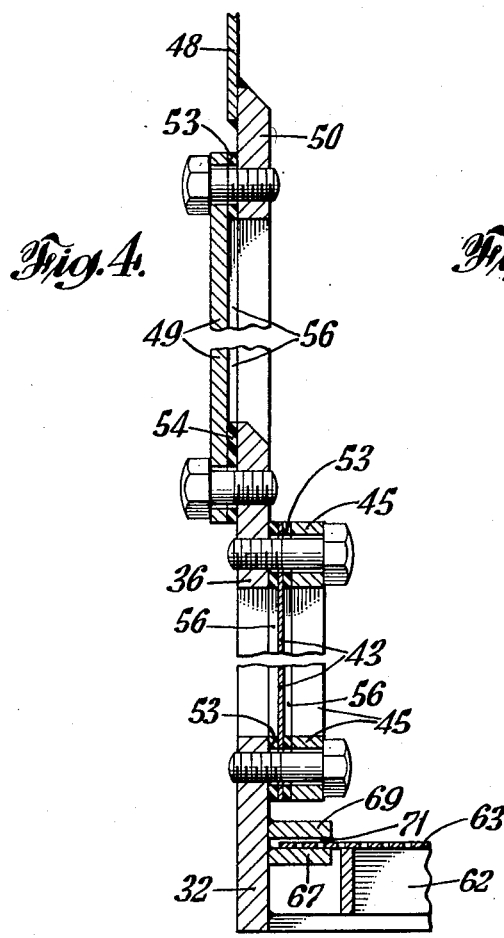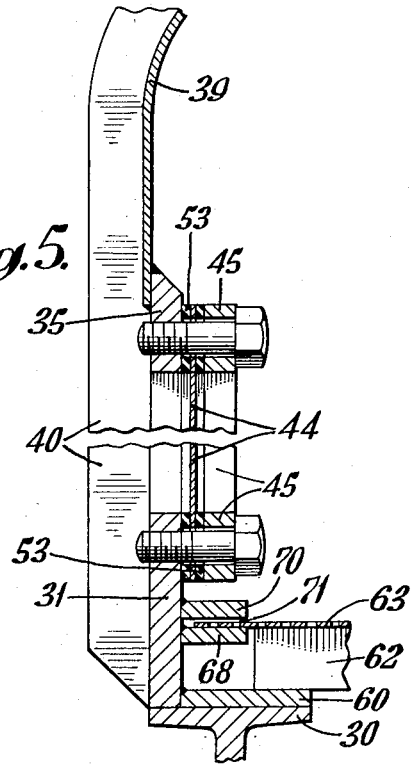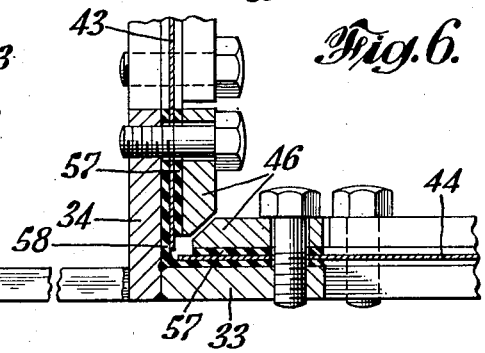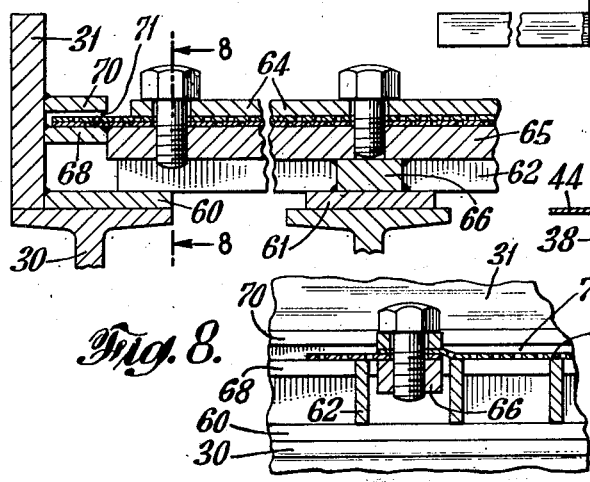

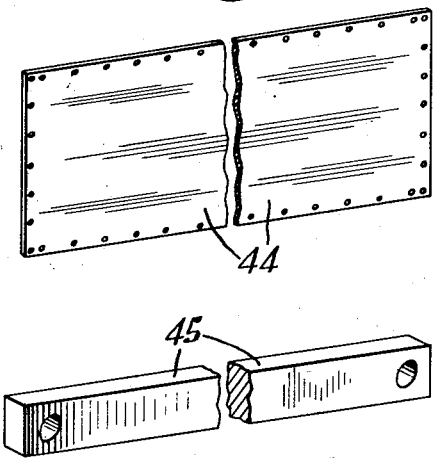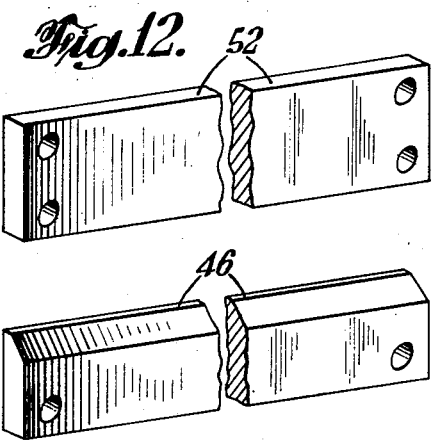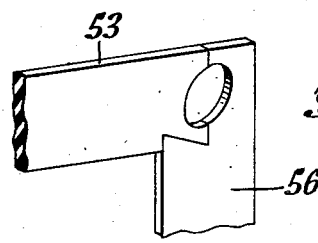

2,772,747
ADSORBER APPARATUS

Frank M. Browning, New York, N. Y., and William B. Leighton, Maplewood, N. J., assignors to Union Carbide and Carbon Corporation, a corporation of New York Application August 18, 1955, Serial No. 529,273

7 Claims. (Cl. 183—4.5)

This invention relates to canopy type adsorber units for separating and recovering fluids and vapors, and more particularly to a sectional construction thereof whereby the life of the adsorber is greatly prolonged and the difficulty and expense of upkeep are greatly reduced.

It is known to improve carbon adsorber efficiency and utility by containing the bed of activated carbon or other adsorbent material in an inner vessel or basket equipped with a so-called "canopy" cover, all within the adsorber shell. Such an adsorber unit is described in U. S. Patent No. 2,180,712 to Leonard A. Logan. The inner vessel in this type of construction contains the adsorbent bed and there is no contact between the adsorbent bed and the outer shell of the vessel. The canopy over the adsorbent material is gas-tight and forms an integral gas-tight vessel above the lower edge of the carbon bed.

The basket and canopy type construction was a distinct advance in the field of carbon adsorption and has been widely accepted and used. The corrosion of the outer shell of the adsorber was largely eliminated by this apparatus. However, even with the basket and canopy type construction the problem of corrosion still exists. Corrosion is particularly severe in that area of the basket which is in contact with the carbon bed, due to the retention of corrosive vapors and gases by the carbon. This necessitates frequent repair to the basket shell containing the carbon bed.

The carbon adsorber baskets heretofore known are of all-welded construction, this construction having been deemed necessary to assure a gas-tight unit. Satisfactory repairs to such baskets can be made only by welding new sections in place or by installing patch plates. Because of the flammable nature of many vapors adsorbed by the adsorbent bed, elaborate precautions must be taken before even the simplest welding repair is attempted. The entire adsorbent bed must be removed, the adsorber vessel, basket and canopy steamed and then thoroughly aired, before it is safe to use a welding torch within the vessel. As the basket and canopy are wholly contained within the outer adsorber shell, access to them is quite difficult. Only minor repairs can be made while the canopy is in place, by welding from inside the basket and canopy unit and then only with great difficulty. When corrosion is severe and continuous, the area of the basket adjacent to the adsorbent bed becomes so corroded that the entire basket and canopy unit must be removed from the adsorber shell and replaced. This usually involves burning off the end of the adsorber shell and welding it back after the replacement of the unit, an obviously unsatisfactory procedure. It has been suggested to flange the head of the adsorber unit so as to facilitate basket replacement. The construction of a flanged head of such large diameter, up to ten feet or more, would be quite expensive however and would require a large number of bolts and special gasketing. Further, the time and labor required to unbolt and then rebolt and regasket such a large flange is considerable.

With a number of solvents and other vapors commonly removed in carbon adsorbers the problem of corrosion of the metal surfaces in contact with the vapors can never be completely eliminated. And with the type of basket and canopy construction now being used the re-repair of even minor corrosion damage is an involved and costly procedure, necessitating a prolonged shutdown of the adsorber unit, for as was pointed out above the vessel must be thoroughly cleaned and aired before any welding is done.

It is therefore the main object of the present invention to provide a sectional adsorber basket and canopy unit construction which not only greatly simplifies the repair of corroded portions of the unit, but has other distinct advantages, as will be seen.

According to the present invention a special framework is provided in the lower portion of the basket and canopy unit and removable panel sections are bolted to this framework to form the basket, using special gasketing material. The entire area of the basket which is in contact with the carbon bed is made up of such panels. Only the overhead canopy, where corrosion is minimal, is of unitary welded construction.

In the drawing:

Fig. 1 is a longitudinal cross-section of a horizontal adsorber vessel, foreshortened in length, showing the relative position of the basket and canopy unit within the adsorber vessel;

Fig. 2 is another cross-section of the adsorber vessel, taken at right angles to Fig. 1, and of the basket and canopy unit and adsorbent bed within the vessel;

Fig. 3 is an end view of the basket and canopy unit;

Figs. 4 through 9 are detail sectional views of the canopy unit construction;

Figs. 10 through 13 are views of the component parts of the special panel of the canopy unit; and Figs. 14 and 15 show the gasketing strips used in the canopy unit.

The apparatus shown in the drawing comprises an adsorber vessel A which contains a basket B for supporting the bed of adsorbent material D and a canopy C for directing the vapor laden air or gases down through the basket B. The basket B and the canopy C together form a gas-tight unit enclosed within the vessel A. The vessel A comprises an adsorber vessel shell 18 having an inlet 19 for vapor laden air and gases and an outlet 20 for air and gases which have been treated. The inlet 19 has a solid condensate drain area 21 and a drain 22. A perforated diffusing baffle 23 receives the incoming vapor laden air or gases and distributes them across the surface area of the adsorbent bed D for processing. A steam inlet 24 admits steam into the interior of the vessel 18 where it is distributed by the steam sparger 25 through holes 26. Lidded and gasketed access manholes 27 and 28 are provided in the adsorber shell 18. Within the shell 18 there are spaced a plurality of basic support I-beams 29 which are welded to the inner surface of the shell 18 and extend across the lower portion of the shell at right angles to the longitudinal axis thereof in the embodiment shown in the drawing. The basket and canopy unit B—C is supported by smaller I-beams forming joists 30 which rest on the beams 29 at right angles thereto and extend along the longitudinal axis of the adsorber unit.

The construction of the basket and canopy unit B—C is as follows. The base of the frame is composed of two side bars 31 and two end bars 32 which are welded at their ends to form a rigid rectangular base which rests on the beams 29. At each corner of the base and on top of bars 31 and 32 are columns consisting of side corner column bars 33 and end corner column bars 34 welded to each other. These corner columns are welded at their lower ends to the ends of the base frame bars 31 and 32 so as to form a fabricated skeleton structure to furnish part of the support for the upper framework. The upper framework consists of two upper side bars 35 and two upper end bars 36, welded at their ends to form a rectangle, and the corners of the rectangle attached to the upper ends of the corner column bars 33 and 34 to form a rigid box-shape basket structure. At regular intervals around the periphery of the basket B, between side bars 31 and upper side bars 35 and between end bars 32 and upper end bars 36, there are welded reinforcing bars 37 and intermediate splice bars 38.

Support for the curved canopy cover 39 of the basket and canopy unit B—C is provided by a plurality of supporting curved rafters 40. The curved rafters 40, curved to the desired shape of the canopy cover 39, are welded to side bars 31 and 35, to reinforcing bars 37 and to intermediate splice bars 38. At each end of the canopy unit C are straight rafters 41, which are welded to end bars 32 and 36 and to reinforcing bars 37. The flat ends 47 and 48 of the canopy cover 39 are further strengthened by horizontal support bars 42 attached to rafters 40 and 41. The canopy cover 39 is an integral welded unit and is supported by and welded to upper side bars 35, upper end bars 36, curved rafters 40, straight rafters 41 and horizontal support bars 42.

The basket unit B is enclosed by the special removable panels of applicants' invention. These end panels 43 and side panels 44 are shown in Figures 1 and 3 of the drawing. End panels 43 of the basket are bolted to end bars 32, end corner column bars 34 and upper end bars 36, using pinch bars 45, 46 and 45 respectively on the inner sides of the end panels 43, and bolts through the pinch bars 45 and 46 and end panel 43 into the bars 32, 34 and 36. The flat end 47 of the canopy cover 39 is pierced by the inlet 19. In the flat end 48 of the canopy cover 39 there is provided an access door 49. The door 49 is bolted to upper end bars 36, and to bars 50 and 51 which are welded to the flat end 48, and to the upper end bar 36.

The side panels 44 of the basket are attached in a similar manner. The side panels 44 are bolted to the corner bars 33, the intermediate splice bar 38, the side bars 31 and the upper side bars 35, using pinch bars 46, 52, 45 and 45 respectively. Special interlocking gasketing, shown in Fig. 14, is used between the pinch bars and the side and end panels and between the side and end panels and the framework to which the panels are bolted. Thus gasket 56 is used between end panels 43 and end bars 32 and upper end bars 36 and between end panels 43 and pinch bars 45. A gasket 58, bent along its longitudinal axis to form a right angle, is used between corner column bars 34 and end panels 43 and between corner column bars 33 and side panels 44. Between pinch bars 46 and side panels 44 and between pinch bars 46 and end panels 43 gaskets 57 are used. The gaskets 53 and 55 are used between side bars 31 and side panels 44 and between end panels 43 and pinch bars 45, as well as between upper side bars 35 and side panels 44. The gasket 59 is used between the intermediate splice bar 38 and side panels 44 and between side panels 44 and pinch bars 52. All of these gaskets are so notched at their ends that when the ends of two gaskets meet they interlock as shown in Fig. 15 so as to give an effective seal, so as to prevent vapor leakage and protect the metal members against corrosive solvent vapor or condensate attack. Similar gaskets 53, 54 and 56 are provided around the edges of access door 49 where it is bolted to the flat end 48 of the canopy unit C.

The adsorbent or carbon bed D is supported by the basket B in the following manner. Two side support bars 60 rest along the length of the two joists 30 and are welded to the two side bars 31 and the two end bars 32. Two intermediate support bars 61 rest along the lengths of the intermediate joists 30 and are welded to the end bars 32. The bars 60 and 61 provide parallel supports for a rigid grating 62 which covers the entire bottom of the basket B. The grating 62 is formed in sections small enough to be removed through the access door 49, each section being continuous across the width of the bottom of the basket B. On top of the grating 62 rests a perforated metal sheet 63 which is the immediate support of the bed of adsorbent material D. The perforated sheet 63 is made in sections slightly larger than the sections of grating 62. Where the sections of perforated sheet 63 meet they overlap and are fastened together, as shown in Fig. 8. The overlapping edge of one section of perforated sheet 63 is bent to lay flat over the edge of the adjoining section. A pinch bar 64 and a transverse clamping bar 65 are bolted together with the edges of the two adjoining sections of the perforated sheet 63 in between. A spacer block 66 is welded to the underside of the clamping bars 65 and the tops of the intermediate support bars 51 at each point where a clamping bar 65 crosses an intermediate support bar 61. These crossovers occur between adjoining sections of the grating 62.

Around the edges of the basket B the perforated metal sheet 63 rests on end edge support bars 67 and on side edge support bars 68 which are welded to end bars 32 and side bars 31. These edge support bars serve to prevent any adsorbent leakage around the edges of the adsorbent bed D. The perforated sheet 63 is held in place around the edges of the adsorber bed D by end retaining bars 69 and side retaining bars 70, which are welded to end bars 32 and side bars 31, respectively. The retaining bars 69 and 70 are located just above the edge support bars 67 and 68, and with them form a continuous slot 71 around the outer edges of the adsorber bed D. The perforated sheet 63 is flexible enough to be slipped into this slot 71, and are held in place in the slot by the retaining and edge support bars which form it. This construction makes it unnecessary to bolt the edges of the perforated sheet 63 in place.

The operation of the adsorber vessel is as follows. During the adsorption cycle vapor laden air or gases enter the vessel shell 18 and then the enclosed canopy cover 39 through the inlet pipe 19. The diffusing baffle 23 assures uniform distribution of the incoming gases over the full area of the adsorbent bed D. The solid condensate drain area 21 collects any condensate formed in the inlet pipe 19 and the condensate is removed through drain 22. The vapor laden air or gases pass downward through the adsorbent bed D and the vapors are adsorbed therein. The air or gases, denuded of vapors, leave the absorber vessel through the outlet 20. In the regenerating cycles steam is admitted to the vessel through steam inlet 24 whence it flows through the steam sparger 25. The steam leaves the sparger 25 through the holes 26 and passes upward through the adsorbent bed D, removing the vapors therefrom. The steam and dissolved vapors exit from the basket and canopy unit B—C and from the adsorber vessel shell 18 through the inlet 19.

In the drawing the invention has been shown embodied in a horizontal cylindrical adsorber. The invention is not limited to this particular style of adsorber however and would function equally well in a vertical adsorber or in one of other than cylindrical shape. Thus the invention can be used in any basket and canopy type vessel regardless of size, shape or position. From the above description the many advantages of the improved construction of the canopy unit are apparent. The adsorbent bed D is contained by the perforated sheet 63 and the side and end panels 44 and 43, all which may be readily and easily removed from the adsorber vessel shell 18 for repair or replacement. It is these parts which, because of contact with the vapors entrapped in the adsorbent bed, will suffer the greatest corrosion damage. The effective life of these parts is but a fraction of that of the rest of the adsorber vessel. Formerly the replacement of these parts was an involved, expensive and time-consuming operation. With the apparatus of our invention however the side and end panels may be removed and replaced quickly and with relative ease. This is made possible by the special framework and gasketing employed.

For the greatest corrosion resistance and longest life of the apparatus it is desirable that all parts, and particularly those in contact with the bed of adsorbent material, be made of a highly corrosion resistant metal. We have obtained excellent results by making the side and end panels of a nickel, chrome, molybdenum and tungsten alloy known as Hastelloy C, ASME Case No. 1194, and the rest of the basket and canopy unit structure of a nickel and copper alloy known as Monel, ASTM Standards B 127–49T and B 164–49T. When the adsorber is used to adsorb certain types of vapors, other construction materials may be more desirable. For particular applications the removable panel sections may be made of such materials as reinforced plastic plates, lead covered steel sheets, silver or platinum plated copper sheets or silicon bronze plates, among others. Because the adsorber parts most subject to corrosion, the side and end panels, are removable and can be replaced, the versatility and value of the adsorber is greatly increased. Thus one adsorber can be used for entirely different types of highly corrosive materials merely by replacing the removable panels.

What is claimed is:

1. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket comprising a skeleton framework and removeable corrosion resistant panels, and detachable means for securing said panels to said framework for ready selective removal and replacement of said panels.

2. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket and canopy comprising a box-shaped skeleton frame, a grating positioned at the bottom of said frame, a perforated sheet resting on said grating, columns spaced around said frame and forming part of said frame, removable corrosion resistant panels secured to said frame and detachable means for securing said panels to said frame for ready selective removal and replacement of said panels.

3. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket and canopy comprising a box-shaped skeleton frame, a grating positioned at the bottom of said frame, a perforated sheet resting on said grating, columns spaced around said frame and forming part of said frame, removable corrosion resistant panels secured to said frame, interlocking strips of corrosion resistant gasketing material positioned between said frame and said corrosion resistant panels, and detachable means for securing said panels to said frame for ready selective removal and replacement of said panels.

4. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket and canopy comprising a box-shaped skeleton frame, a grating positioned at the bottom of said frame, a perforated sheet resting on said grating, columns spaced around said frame, and forming a part of said frame, removable corrosion resistant panels secured to the inner surfaces of said frame, pinch bars positioned on the inner surface of said panels opposite said frame and bolts extending through said pinch bars, panels and frame to secure said panels to said frame whereby said panels are readily selectively removable and replaceable.

5. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket and canopy comprising a box-shaped skeleton frame, a grating positioned at the bottom of said frame, a perforated sheet resting on said grating, columns spaced around said frame, and forming a part of said frame, removable corrosion resistant panels secured to the inner surfaces of said frame, interlocking strips of corrosion resistant gasketing material positioned between said frame and the outer surfaces of said panels, pinch bars positioned on the inner surfaces of said panels opposite said frame, interlocking strips of gasketing material positioned between said pinch bars and the inner surfaces of said panels and bolts extending through said pinch bars, strips of gasketing material, panels and frame to secure said panels to said frame whereby said panels are readily selectively removable and replaceable.

6. An adsorber for recovering fluids and vapors from mixtures thereof with gases, comprising a container vessel, a basket within said vessel, a bed of adsorbent material contained by said basket, a fluid-tight canopy over said basket forming a closed gas space above said bed of adsorbent material, said basket and canopy comprising a box-shaped skeleton frame, a grating positioned at the bottom of said frame, a perforated sheet resting on said grating, columns spaced around said frame, and forming a part of said frame, removable corrosion resistant panels secured to the inner surfaces of said frame, interlocking strips of corrosion resistant gasketing material positioned between said frame and the outer surfaces of said panels, pinch bars positioned on the inner surfaces of said panels opposite said frame, interlocking strips of gasketing material positioned between said pinch bars and the inner surfaces of said panels, bolts extending through said pinch bars, strips of gasketing material, panels and frame to secure said panels to said frame whereby said panels are readily selectively removable and replaceable, continuous rafters secured to said frame and extending above said frame, sheets of corrosion resistant material secured to said rafters to form said fluid-tight canopy over said basket, inlet means for vapor laden gases communicating with said closed gas space above said bed of adsorbent material, exit means for denuded air from said container vessel, and steam inlet means for admitting steam into the interior of said vessel beneath said bed of adsorbent material.

7. An adsorber according to claim 1 wherein said frame and said fluid-tight canopy are made of a corrosion resistant nickel and copper alloy and said removable panels are made of a corrosion resistant nickel, chrome, molybdenum and tungsten alloy.

References Cited in the file of this patent

UNITED STATES PATENTS

| | | |
|---|---|---|
| 2,109,655 | Sylvan | Mar. 1, 1938 |
| 2,180,712 | Logan | Nov. 21, 1939 |
| 2,730,208 | Valentine | Jan. 10, 1956 |